(12) United States Patent
Imoto

(10) Patent No.: US 10,518,722 B2
(45) Date of Patent: Dec. 31, 2019

(54) AUTOMOTIVE POWER SUPPLY DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Masayoshi Imoto, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 72 days.

(21) Appl. No.: 15/549,717

(22) PCT Filed: Feb. 8, 2016

(86) PCT No.: PCT/JP2016/053608
§ 371 (c)(1),
(2) Date: Aug. 9, 2017

(87) PCT Pub. No.: WO2016/136440
PCT Pub. Date: Sep. 1, 2016

(65) Prior Publication Data
US 2018/0015889 A1 Jan. 18, 2018

(30) Foreign Application Priority Data
Feb. 24, 2015 (JP) .................. 2015-034400

(51) Int. Cl.
*B60R 16/02* (2006.01)
*B60R 16/033* (2006.01)
*B60R 16/04* (2006.01)

(52) U.S. Cl.
CPC ........ *B60R 16/0207* (2013.01); *B60R 16/033* (2013.01); *B60R 16/04* (2013.01)

(58) Field of Classification Search
CPC ..... B60R 16/00; B60R 16/0207; B60R 16/03; B60R 16/033; B60R 16/04; H02G 3/00;
(Continued)

(56) References Cited

U.S. PATENT DOCUMENTS 5,623,169 A * 4/1997 Sugimoto ........... B60R 16/0207
307/10.1
5,818,673 A 10/1998 Matsumaru et al.
(Continued)

FOREIGN PATENT DOCUMENTS

JP H02-025343 U 2/1990
JP H05-058230 A 3/1993
(Continued)

OTHER PUBLICATIONS

Search Report for PCT/JP2016/053608, dated Apr. 12, 2016.

*Primary Examiner* — Lincoln D Donovan
*Assistant Examiner* — Dave Mattison
(74) *Attorney, Agent, or Firm* — Honigman LLP

(57) ABSTRACT

An automotive power supply device includes a trunk harness structure that is arranged on a floor in the central portion in the width direction of a vehicle body. The trunk harness structure is provided with a battery, and a power supply wiring line for supplying electric power to loads mounted on the vehicle body.

3 Claims, 1 Drawing Sheet

(58) Field of Classification Search
CPC .................. H02G 3/38; H04B 2203/00; H04B 2203/5445; H04B 2203/5458; H04B 2203/5483; H04B 3/00; H04B 3/56; H04L 12/00; H04L 12/10
USPC ..................................................... 307/1, 10.1
See application file for complete search history.

(56) References Cited

U.S. PATENT DOCUMENTS

2012/0019061 A1* 1/2012 Nishihara ........... H01M 2/1077
 307/10.1
2016/0304041 A1* 10/2016 Lennevi .................... B60L 1/00
2017/0317439 A1* 11/2017 Zebhauser ......... H01R 13/6463

FOREIGN PATENT DOCUMENTS

| JP | H09-066778 A | 3/1997 |
| JP | H09-238985 A | 9/1997 |
| JP | H09-275632 A | 10/1997 |
| JP | 2002-078185 A | 3/2002 |
| JP | 2010-288328 A | 12/2010 |
| JP | 2013-112137 A | 6/2013 |
| WO | 2010-126005 A1 | 11/2010 |

* cited by examiner

AUTOMOTIVE POWER SUPPLY DEVICE

CROSS-REFERENCE TO RELATED APPLICATIONS

This application is the U.S. national stage of PCT/JP2016/053608 filed Feb. 8, 2016, which claims priority of Japanese Patent Application No. JP 2015-034400 filed Feb. 24, 2015.

TECHNICAL FIELD

The present invention relates to an automotive power supply device.

BACKGROUND

Multiple pieces of electrical equipment that are mounted in automobiles are supplied with electric power from a battery arranged in an engine room via power supply lines. Furthermore, the pieces of electrical equipment are configured to send and receive the necessary communication signals via signal lines.

Wire harnesses, which are bundles of multiple power supply lines and signal lines, are arranged in a vehicle interior.

Wire harnesses such as those described above are mainly arranged along a peripheral portion of the floor in the vehicle interior. Accordingly, due to deformation of a vehicle body caused by a vehicle collision, the wire harness may be damaged, and the power supply lines or the signal lines may be disconnected, resulting in an interruption of power supply to the pieces of electrical equipment, or an interruption of communication between the pieces of electrical equipment.

JP H09-275632A discloses a configuration in which a supply path is switched in case where an abnormality occurs in an electric power trunk line via which electric power is supplied to electrical junction boxes arranged in various places in the vehicle. However, the electric power trunk line is arranged in an outer peripheral portion of the vehicle body, and thus, if the wire harness is disconnected at the time of a vehicle collision, power supply or communication is inevitably interrupted.

JP H09-66778A discloses a configuration in which a wire harness in an instrument panel is built in an instrument panel reinforcement. However, a wire harness in the vehicle interior is arranged in an outer peripheral portion of the vehicle body, and thus, if the wire harness is disconnected at the time of a vehicle collision, power supply or communication is inevitably interrupted.

It is an object of the present invention to provide an automotive power supply device that can reliably supply electric power to pieces of automotive electrical equipment.

According to an aspect of the present invention, an automotive power supply device includes a trunk harness structure that is arranged on a floor in a central portion in a width direction of a vehicle body, and is provided with a battery and a power supply wiring line, wherein the trunk harness structure is configured to supply electric power from the power supply wiring line to loads mounted on the vehicle body.

With this configuration, the battery and the power supply wiring line are protected by the trunk harness structure, and the loads can reliably be supplied with electric power.

Preferably, the trunk harness structure is located between a front vehicle axis and a rear vehicle axis.

With this configuration, even if the vehicle is in a collision from the front or the back, the trunk harness structure is prevented from being damaged.

Preferably, the trunk harness structure is further provided with a signal wiring line that is arranged in parallel to the power supply wiring line.

With this configuration, the signal wiring line is protected by the trunk harness structure.

Preferably, the trunk harness structure is further provided with a terminal connection portion for connecting a load to the power supply wiring line and the signal wiring line.

With this configuration, the load is reliably supplied with electric power, and stable communication between loads is ensured.

Preferably, the power supply wiring line is a plate-shaped metal wiring line, and the terminal connection portion is connected to the metal wiring line.

With this configuration, the load is supplied with electric power via the metal wiring line.

In some installation example, the trunk harness structure may further be provided with a power supply control unit configured to control charge of the battery.

With this configuration, it is possible to protect the power supply control unit against deformation of the vehicle body that is caused due to a collision.

In some installation example, the trunk harness structure may include a case that has shape retentionability or is self-standing, and in which the battery and the power supply wiring line are arranged.

With this configuration, it is possible to protect the battery and the power supply wiring line against deformation of the vehicle body that is caused due to a collision.

Advantageous Effects of Invention

According to some aspects of the present invention, it is possible to provide an automotive power supply device that can reliably supply electric power to pieces of automotive electrical equipment. Other aspects and advantages of the present invention will be apparent from the following description with reference to the drawings showing examples of the technical ideas of the present invention.

DETAILED DESCRIPTION OF PREFERRED EMBODIMENTS

Figure 1:
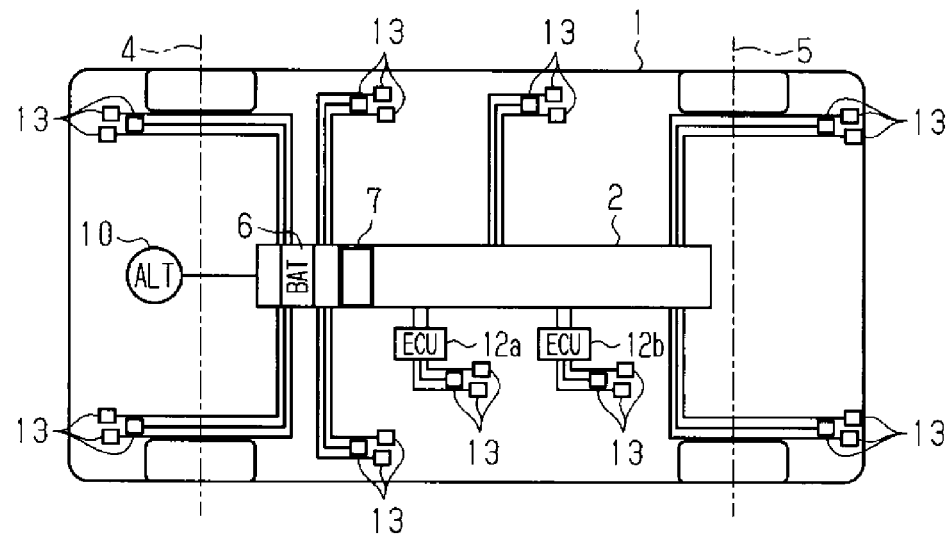
FIG. 1 is a schematic diagram illustrating an automotive power supply device.

Hereinafter, an embodiment of an automotive power supply device will be described with reference to the drawings. The automotive power supply device shown in FIG. 1 is provided with a trunk harness structure 2 in a central portion of a vehicle body 1.

More specifically, the trunk harness structure 2 may be provided with an electrically insulating case 3 that is arranged in the central portion of the floor of the vehicle body 1 extending in a length direction thereof. The case 3 is elongated, and has the shape of an elongated box, for example. The front end and the rear end of the case 3 are located between a front vehicle axis 4 and a rear vehicle axis 5. The case 3 may be made of, for example, a synthetic resin. The case 3 may have shape retentionability or be self-standing.

Figure 2:
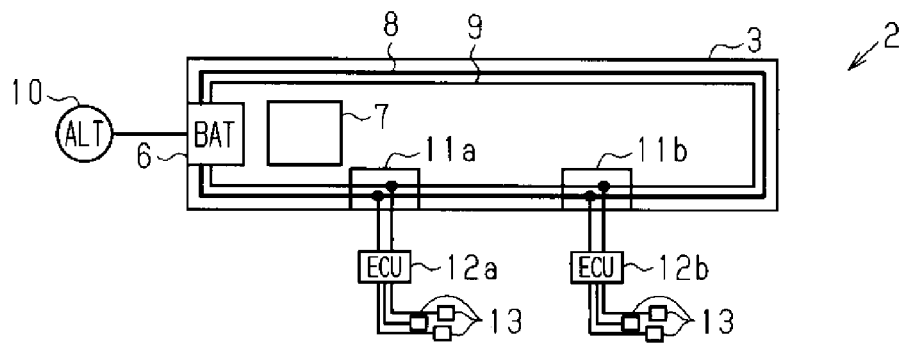
FIG. 2 is a diagram illustrating a trunk harness structure.

As shown in FIG. 2, a battery 6, a power supply control unit 7, and a metal wiring line 8 and a signal wiring line 9 that are connected to the battery 6 are arranged in the case 3. An alternator (ALT) 10 that is arranged in an engine room is connected to the battery 6. When the alternator 10 is operated, the battery 6 is charged with electric power generated by the alternator 10 in accordance with control of the power supply control unit 7.

The metal wiring line 8 is plate-shaped, is connected to a positive side terminal of the battery 6, and is laid in a loop shape along the inner peripheral surface of the case 3. The metal wiring line 8 is supplied with positive side electric power from the battery 6 in accordance with control of the power supply control unit 7. The signal wiring line 9 may include a plurality of signal lines that are laid in a loop shape extending parallel to the metal wiring line 8.

In this embodiment, negative side power supply is a body ground, but in a vehicle that cannot employ a body ground structure, such as a vehicle whose body is made of a carbon fiber, a negative side metal wiring line may also be arranged in parallel to the metal wiring line 8.

The metal wiring line 8 and the signal wiring line 9 have, at a plurality of positions, terminal connection portions 11a and 11b, and the terminal connection portions 11a and 11b are respectively connected to ECUs 12a and 12b. The ECUs 12a and 12b operate based on electric power supplied from the metal wiring line 8, and can communicate with another ECU via the signal wiring line 9.

One or more loads 13 are connected to each of the ECUs 12a and 12b. The ECUs 12a and 12b control the operations of the corresponding loads 13. The loads 13 are not particularly limited but can include, for example, loads that are arranged in the vicinity of the inner surface of an outer panel of the vehicle body 1, such as a head lamp, a brake lamp, a door lock motor, a power window motor, and a sensor. The exemplified ECUs 12a and 12b themselves are included in the loads.

Furthermore, as shown in FIG. 1, the multiple loads 13 are connected to the trunk harness structure 2 via or without the ECUs 12a and 12b. The loads 13 are supplied with electric power from the metal wiring line 8, and are controlled by the ECUs 12a and 12b, or another control unit.

The following will describe functions of the automotive power supply device that has the above-described configuration.

The power supply control unit 7 and the ECUs 12a and 12b are supplied with electric power from the battery 6 that is arranged inside the trunk harness structure 2. The ECUs 12a and 12b control the operations of the corresponding loads 13 in response to the supply of electric power. The discharge and charge operations of the battery 6 are controlled by the power supply control unit 7.

The trunk harness structure 2 is arranged in the central portion in the width direction of the vehicle body 1, and between the front vehicle axis 4 and the rear vehicle axis 5. The battery 6, the power supply control unit 7, the metal wiring line 8, and the signal wiring line 9 are arranged inside the trunk harness structure 2.

Accordingly, even if this automobile is damaged in its front or rear portion due to a collision, or is damaged due to its side being hit from the left or right, the trunk harness structure 2 is unlikely to be damaged, and thus the normal operation of the battery 6, the power supply control unit 7, the metal wiring line 8, and the signal wiring line 9 are ensured.

In the automotive power supply device as described above, the following effects can be achieved.

(1) Even if the automobile is in a collision, it is possible to reliably supply electric power to the ECUs 12a and 12b, and the loads 13.

(2) It is possible to protect the battery 6, and the metal wiring line 8 for supplying the electric power from the battery 6 to the ECUs 12a and 12b and the loads 13, using the trunk harness structure 2 that is arranged in the central portion of the vehicle body 1.

(3) Since the trunk harness structure 2 is arranged between the front vehicle axis 4 and the rear vehicle axis 5, it is possible to realize the trunk harness structure 2 that is unlikely to be damaged if the automobile is in a collision from the front or the back.

(4) Since the trunk harness structure 2 is arranged in the central portion in the width direction of the vehicle body 1, it is possible to realize the trunk harness structure 2 that is unlikely to be damaged if the automobile is in a collision from the side.

(5) Since the loads 13 and the ECUs 12a and 12b can be supplied with electric power from the metal wiring line 8, no power supply harness that is made of a plurality of power supply wiring lines needs to be arranged in the trunk harness structure 2.

Note that the foregoing embodiment may be modified as follows.

Figure 3:
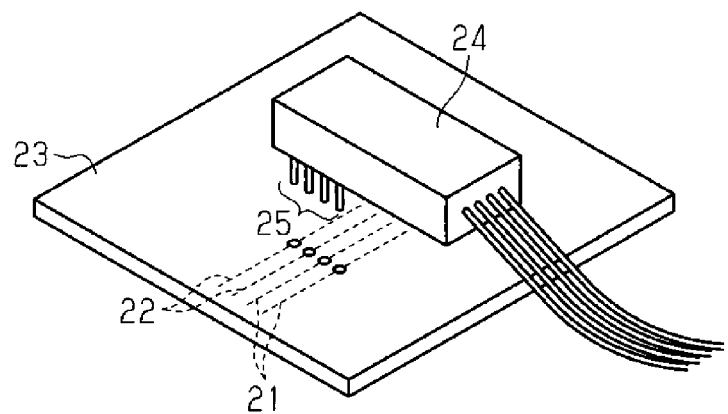
FIG. 3 is a perspective view illustrating a terminal connection portion.

The terminal connection portions of the trunk harness structure may have a configuration in which the loads are directly connected to the trunk harness structure, and may employ, for example, fitting of press-fit terminals and pin holes. For example, as shown in FIG. 3, a substrate 23 on which power supply wiring lines 21 and signal wiring lines 22 are laid out in advance is fitted to terminals 25 of an ECU 24 inside the trunk harness structure, and thus the ECU 24 may be electrically connected to the power supply wiring lines 21 and the signal wiring lines 22. FIG. 3 shows connection lines for connecting this ECU 24 to the corresponding loads 13.

The metal wiring line may have, instead of a loop shape, a structure in which a part of a loop is open.

The metal wiring line for supplying positive side electric power may include metal wiring lines, one of which is connected to ignition-related loads for supplying electric power when an ignition switch is turned on, and the other of which is for supplying electric power to the remaining accessory-related loads, the metal wiring lines being arranged separately. In this case, it is preferable to provide switches that open and close the connection between the metal wiring lines and the battery.

Also in a case where a metal wiring line for supplying negative side electric power is arranged in the trunk harness structure, this metal wiring line, similar to the positive side metal wiring line, may have a loop shape, or a structure in which a part of a loop is open. Furthermore, a configuration is also possible in which branch lines extend to both sides from the trunk line in the center.

A configuration is also possible in which the positive side electric power and the negative side electric power are supplied via power supply wiring lines other than the metal wiring lines.

The present invention is not limited to the examples. For example, the exemplified features are not to be construed as being essential for the present invention, and the subject matter of the present invention may also exist with fewer features than all the features of the disclosed specific embodiments. Accordingly, the scope of the present invention is to be determined not with reference to the exemplified embodiment but with reference to the claims together with the entire scope equivalent thereto.

The invention claimed is:

1. An automotive power supply device comprising:
an elongated trunk harness structure that is arranged on a floor in a central portion in a width direction of a vehicle body extending in a length direction of the vehicle body, and is provided with a battery and a power supply wiring line, wherein the power supply wiring line is a plate-shaped metal wiring line, and the terminal connection portion is connected to the metal wiring line,
wherein the trunk harness structure is configured to supply electric power from the power supply wiring line to a plurality of loads mounted on the vehicle body,
the trunk harness structure includes a case having a pair of side walls, a front wall, a back wall and a top wall defining an inner space, the case has shape retentionability or is self-standing, the battery is disposed within the space of the case and the power supply wiring line is also disposed within the space of the case and connected to the battery, wherein the power supply wiring line is laid in a loop shape so as to be disposed along an inner peripheral surface of the case, wherein the trunk harness structure is further provided with a signal wiring line that is arranged in parallel to the power supply wiring line; and
the trunk harness structure is provided with a plurality of terminal connection portions that are arranged at a distance with respect to each other in a longitudinal direction of the trunk harness structure, the terminal connection portions each including a power supply pin hole for directly connecting a power supply terminal of a load to the power supply wiring line and wherein each of the terminal connection portions of the trunk harness structure is further provided with a signal pin hole for directly connecting a signal terminal of a load to the signal wiring line.

2. The automotive power supply device according to claim 1,
wherein the trunk harness structure is located between a front vehicle axis and a rear vehicle axis.

3. The automotive power supply device according to claim 1, wherein the trunk harness structure is further provided with a power supply control unit disposed interior to and spaced apart from the power supply wiring line and configured to control the charge of the battery.

* * * * *